United States Patent
Dolny et al.

(10) Patent No.: US 10,906,391 B2
(45) Date of Patent: Feb. 2, 2021

(54) FUEL TANK HAVING INLET CHECK VALVE

(71) Applicant: TI Automotive Technology Center GmbH, Rastatt (DE)

(72) Inventors: Tomasz Dolny, Baden (DE); Manuel Lindow, Gernsbach (DE); Martin Stickel, Kuppenheim (DE); Albert J. Boecker, Ettlingen (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 104 days.

(21) Appl. No.: 15/771,630

(22) PCT Filed: Oct. 26, 2016

(86) PCT No.: PCT/EP2016/075720
§ 371 (c)(1),
(2) Date: Apr. 27, 2018

(87) PCT Pub. No.: WO2017/072135
PCT Pub. Date: May 4, 2017

(65) Prior Publication Data
US 2018/0326841 A1    Nov. 15, 2018

(30) Foreign Application Priority Data
Oct. 29, 2015 (DE) .................. 10 2015 221 227

(51) Int. Cl.
*F16K 24/00* (2006.01)
*B60K 15/035* (2006.01)
*B60K 15/04* (2006.01)

(52) U.S. Cl.
CPC ........ *B60K 15/03519* (2013.01); *B60K 15/04* (2013.01); *B60K 2015/03523* (2013.01);
(Continued)

(58) Field of Classification Search
CPC ..... Y10T 137/86324; Y10T 137/86332; Y10T 137/86348; Y10T 137/7849
See application file for complete search history.

(56) References Cited

U.S. PATENT DOCUMENTS 2,613,013 A * 10/1952 Van Pelt ................. F16K 17/19
                                                137/588
3,275,028 A * 9/1966 Reppert .................. F16K 15/03
                                                137/527.6
(Continued)

FOREIGN PATENT DOCUMENTS

DE            60310091 T2     6/2007
DE       10 2007 036112 A1    2/2009
(Continued)

OTHER PUBLICATIONS

International Preliminary Report on Patentability, International Application No. PCT/EP2016/075720, dated May 1, 2018, 7 pgs.
(Continued)

*Primary Examiner* — Robert K Arundale
(74) *Attorney, Agent, or Firm* — Dickinson Wright PLLC

(57) ABSTRACT

The present disclosure relates to a fuel tank comprising a filling tube opening via an inlet check valve into the fuel tank and comprising a venting device for discharging fuel vapors from the fuel tank. According to the present disclosure, the venting device has at least one venting line, which extends into the interior of the fuel tank and opens with an open end into a gas volume in the region of an upper wall part of the fuel tank, wherein the at least one venting line is guided such that it forms a siphon in the region of a lower wall part, and the inlet check valve has a bypass connection, to which the at least one venting line is connected.

4 Claims, 9 Drawing Sheets

(52) U.S. Cl.
CPC ............... *B60K 2015/03552* (2013.01); *B60K 2015/0461* (2013.01); *Y10T 137/7849* (2015.04); *Y10T 137/86332* (2015.04)

(56) References Cited

U.S. PATENT DOCUMENTS

| | | | | |
|---|---|---|---|---|
| 4,394,925 A * | 7/1983 | Rump | .................... | B60K 15/04 137/587 |
| 4,724,861 A * | 2/1988 | Covert | .................... | B60K 15/04 137/202 |
| 4,730,652 A * | 3/1988 | Bartholomew | ...... | B60K 15/035 137/588 |
| 4,917,157 A * | 4/1990 | Gifford | .................. | B60K 15/04 123/519 |
| 4,958,655 A * | 9/1990 | Danek | .................. | B60K 15/035 123/516 |
| 5,263,511 A * | 11/1993 | Ohasi | ............... | B60K 15/03519 137/588 |
| 5,343,905 A * | 9/1994 | Gryc | ................ | B60K 15/03504 137/587 |
| 5,373,957 A * | 12/1994 | Gryc | ...................... | B60K 15/04 137/202 |
| 5,462,100 A | 10/1995 | Covert et al. | | |
| 5,507,324 A * | 4/1996 | Whitley, II | ............ | B60K 15/05 141/59 |
| 5,730,194 A * | 3/1998 | Foltz | .................... | B60K 15/04 137/588 |
| 5,950,655 A * | 9/1999 | Benjey | ............. | B60K 15/03519 137/202 |
| 6,029,719 A * | 2/2000 | Hor | ...................... | B60K 15/035 137/588 |
| 6,092,685 A * | 7/2000 | Gruber | ............. | B60K 15/03504 137/588 |
| 6,269,832 B1 | 8/2001 | Besnard et al. | | |
| 7,168,466 B2 | 1/2007 | Ganachaud et al. | | |
| 8,763,646 B2 * | 7/2014 | Kraemer | .......... | B60K 15/03519 137/202 |
| 9,434,247 B2 | 9/2016 | Koukan et al. | | |
| 9,758,034 B2 * | 9/2017 | Booth | ................ | B60K 15/0406 |
| 2002/0112763 A1 * | 8/2002 | Romanek | ......... | B60K 15/03504 137/588 |
| 2005/0139260 A1 * | 6/2005 | Martis | ................... | B60K 15/035 137/2 |
| 2005/0139271 A1 | 6/2005 | Krishnamoorthy et al. | | |
| 2005/0205156 A1 | 9/2005 | Ganachaud et al. | | |
| 2008/0142111 A1 | 6/2008 | Osterbrink et al. | | |
| 2012/0228292 A1 | 9/2012 | Doble et al. | | |
| 2012/0298228 A1 * | 11/2012 | Walkowski | ............ | B60K 15/04 137/565.17 |
| 2012/0298385 A1 | 11/2012 | Marsala et al. | | |

FOREIGN PATENT DOCUMENTS

| | | |
|---|---|---|
| DE | 102010053994 A1 | 1/2012 |
| JP | H06320967 A | 11/1994 |
| JP | 2013536111 A | 9/2013 |
| WO | WO2012/010247 A2 | 1/2012 |

OTHER PUBLICATIONS

International Search Report for International Application No. PCT/EP2016/075720, dated Dec. 23, 2016, 2 pgs.
English translation of Japanese Office Action dated May 28, 2019.
English translation of Korean Office action dated Mar. 4, 2019.
German Search Report dated Nov. 14, 2015.

* cited by examiner (Stand der Technik)

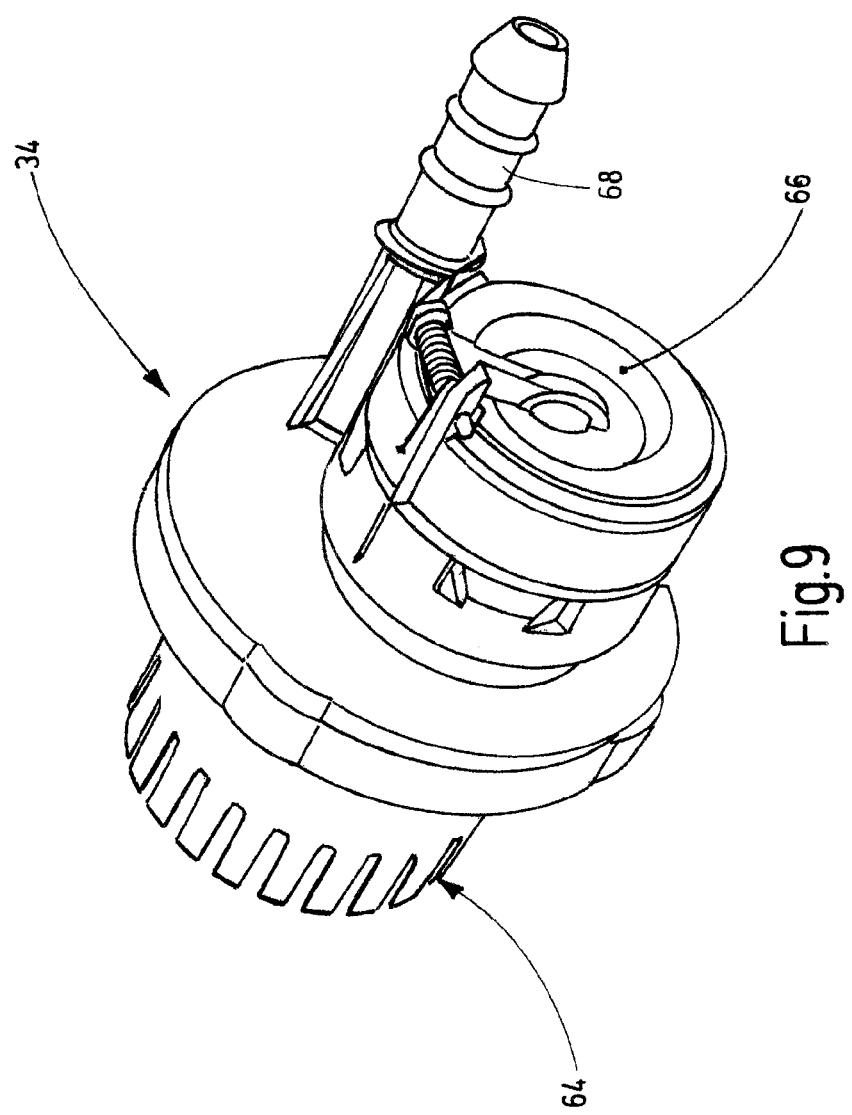

FUEL TANK HAVING INLET CHECK VALVE

RELATED APPLICATIONS

This application is a 35 U.S.C. § 371 national phase application of International Application No. PCT/EP2016/075720, filed on Oct. 26, 2016, which claims the priority of German Patent Application DE 10 2015 221 227.0, filed Oct. 29, 2015, the contents of which are incorporated herein by reference in their entirety.

FIELD

The present disclosure relates to a fuel tank comprising a filling tube opening via an inlet check valve into the fuel tank and comprising a venting device for discharging fuel vapors from the fuel tank, and also a corresponding check valve.

BACKGROUND

Fuel tanks for vehicles typically have operational airing and venting, for example, to enable a pressure equalization of the tank interior with the surroundings during fill-up or in the event of temperature changes. Known systems use one or more valves for this purpose, so-called rollover valves (ROV), which are arranged penetrating different locations of the upper tank wall. The ROV additionally has or have the property of blocking in the event of a rollover of the vehicle, so that fuel cannot run out via the valve. It is considered to be disadvantageous to use of ROV since they represent a significant cost factor and they penetrate the tank wall, i.e., they require tank openings to be sealed.

SUMMARY

Proceeding therefrom, the present disclosure provides a fuel tank of the type mentioned at the outset comprising a simple and cost-effectively designed venting device.

It is provided according to the present disclosure that the venting device has at least one venting line, which extends into the interior of the fuel tank and opens with an open end into a gas volume in the region of an upper wall part of the fuel tank, wherein the at least one venting line is guided such that it forms a siphon in the region of a lower wall part, and the inlet check valve has a bypass connection, to which the at least one venting line is connected.

In one preferred embodiment of the present disclosure, two or more venting lines are provided, the open ends of which are arranged in the region of the upper wall part such that in any inclined position and any fill level of the fuel tank, at least one venting line opens into a gas volume.

An improvement of the pressure tightness of the venting device in the upside-down position can be achieved in that a valve, in particular a ball valve, is arranged at the open end of the at least one venting line, which valve is open in a normal position of the fuel tank and is closed in an upside-down position.

The inlet check valve according to the present disclosure has a bypass line which bypasses a check body of the inlet check valve, and to which the at least one venting line arranged in the fuel tank is connectable, and therefore it is in fluid communication with the filling tube.

BRIEF DESCRIPTION OF THE DRAWINGS

The present disclosure will be explained in greater detail hereafter on the basis of an exemplary embodiment schematically illustrated in the drawing. In the figures:

FIG. 9 shows an inlet check valve comprising a bypass line.

DETAILED DESCRIPTION

Figure 1:
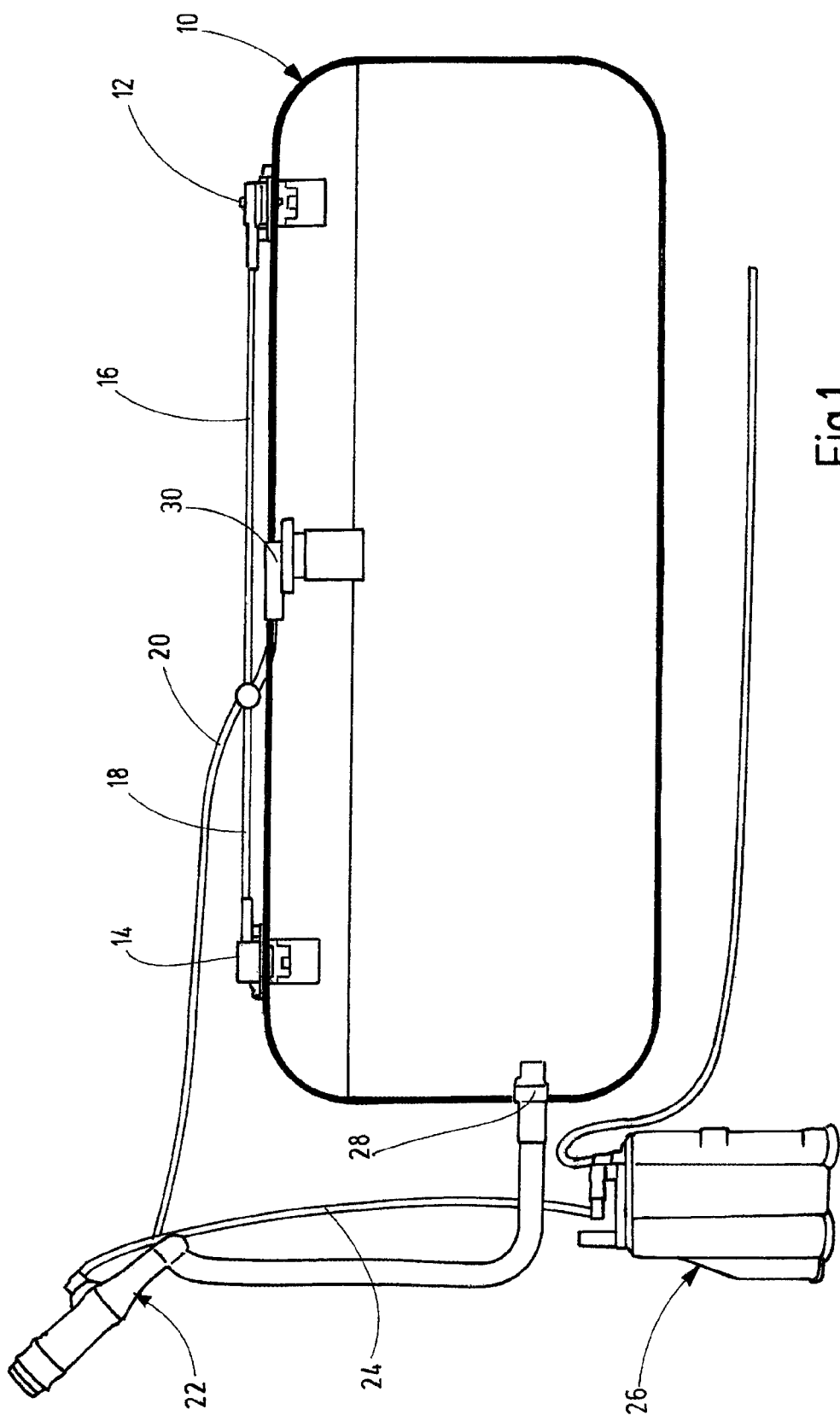
FIG. 1 shows a fuel tank comprising a venting device according to the prior art.

Now, a preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

The fuel tank 10 shown in FIG. 1 has a known venting device. It comprises two rollover valves (ROV) 12, 14, which are arranged in an upper wall part of the fuel tank 10, and which communicate via lines 16, 18, 20 with a filling tube 22, from which fuel vapors are supplied via a line 24 to an activated carbon filter 26 and from there to the engine. The filling tube opens via a conventional inlet check valve 28, which is not part of the venting device, into the fuel tank 10. The valves 12, 14 are arranged far apart from one another, and therefore in an inclined position of the tank, at least one of the valves is not covered by liquid (comparable to the situation shown in FIGS. 4 and 7). The valves 12, 14 protrude comparatively far into the interior of the fuel tank 10. Since the valves 12, 14 cannot be covered simultaneously by liquid fuel, a fill-up procedure is terminated by the shutoff valve 30. The volume of the fuel tank therefore cannot be used optimally.

Figure 2:
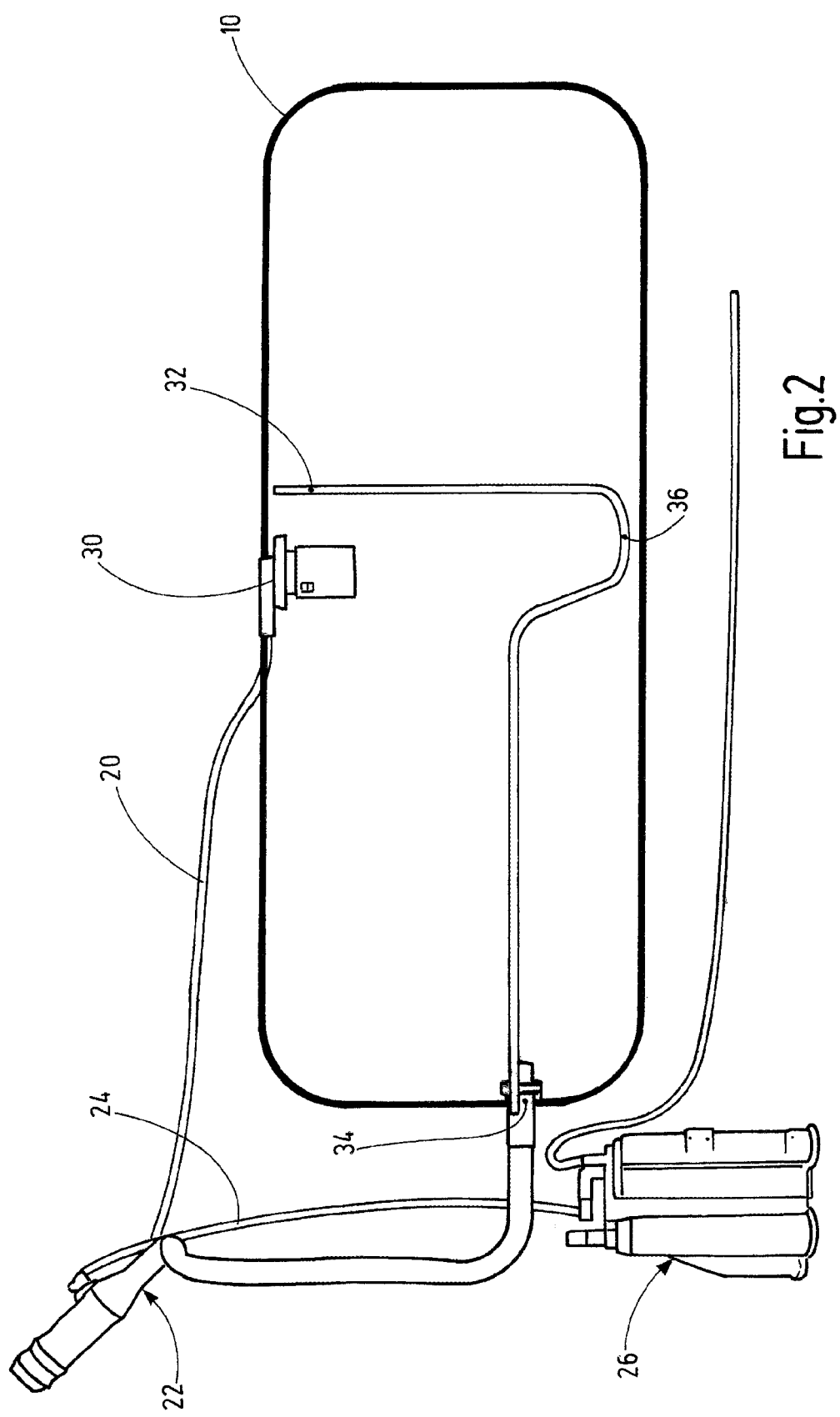
FIG. 2 shows a fuel tank comprising a first exemplary embodiment of a venting device having a single venting line.

FIG. 2 shows a first exemplary embodiment of the present disclosure, which can be implemented substantially more cost-effectively than the system of FIG. 1. Rollover valves are not provided, and therefore corresponding openings in the tank wall are not required. Instead, a venting line 32 extending into the tank interior is provided, the open end of which is arranged in direct proximity to the upper housing wall, and the other end of which is connected to a bypass line at the inlet check valve 34. The venting opening thus also communicates here with the filling tube 22. It is arranged approximately in the middle of the fuel tank 10, so that slightly inclined positions do not interfere with the venting function. Due to the venting line 32, which extends far up to the tank wall, the fuel tank may also be filled up to a higher level, and therefore the use of the tank volume is improved in relation to the situation illustrated in FIG. 1. The venting line 32 is guided in a curve 36 forming a siphon in the vicinity of the lower wall part of the fuel tank 10.

Figure 3:
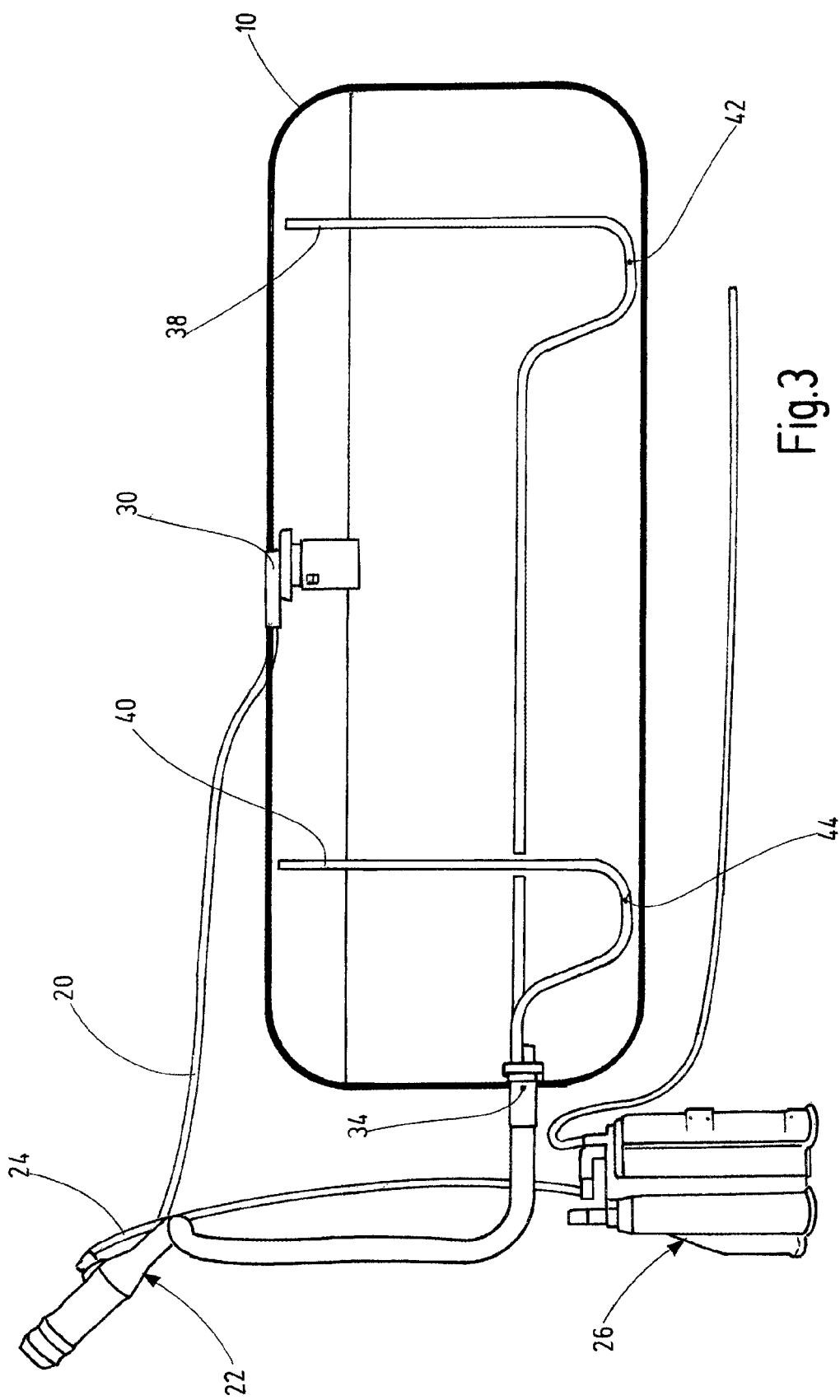
FIG. 3 shows a fuel tank comprising an exemplary embodiment of a venting device having two venting lines.
Figure 4:
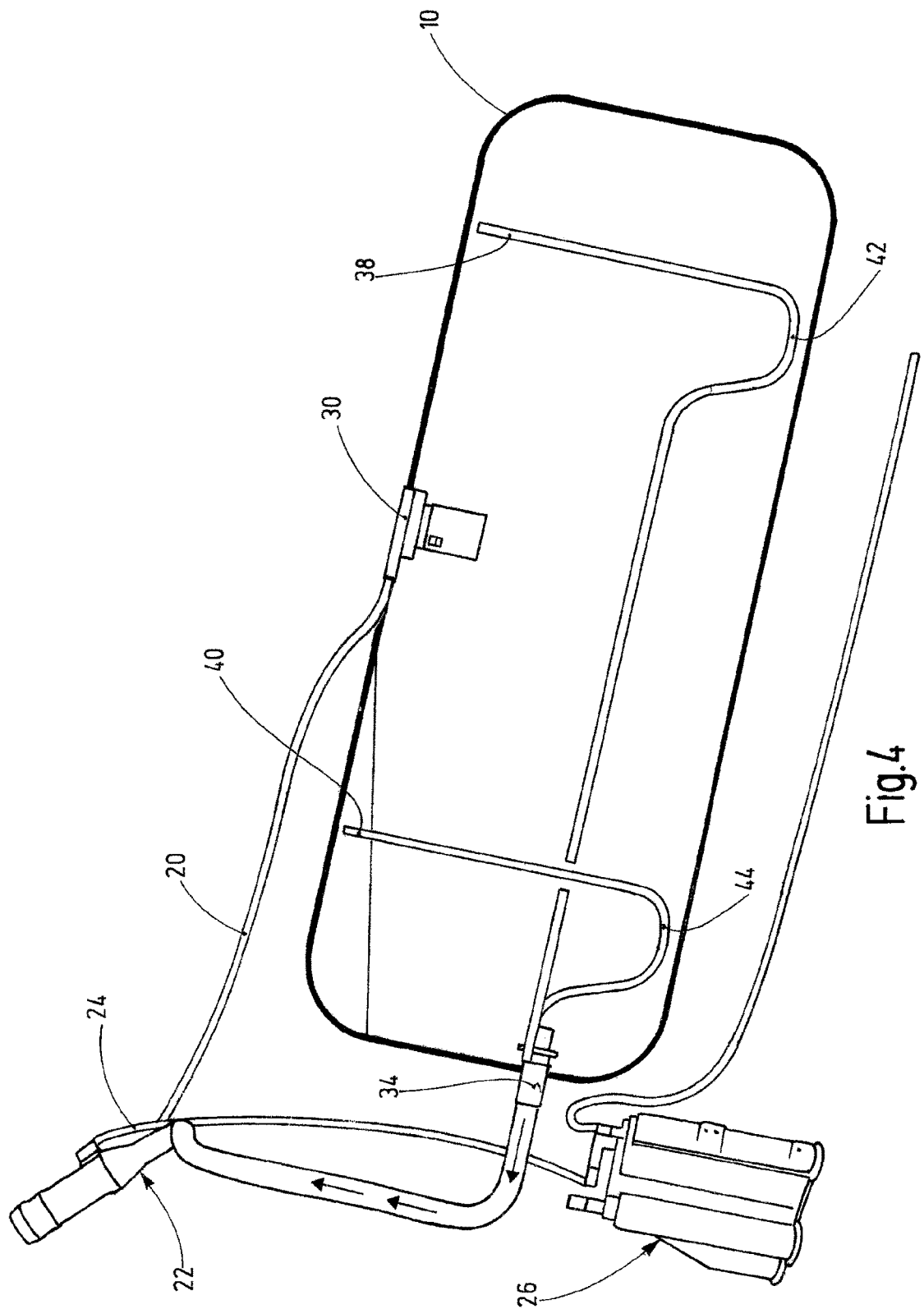
FIG. 4 shows the fuel tank according to FIG. 3 in an inclined position.

FIG. 3 corresponds to FIG. 2, wherein two venting lines 38, 40 are provided, however, the open ends of which are arranged approximately like the rollover valves 12, 14 in FIG. 1. This ensures that in an inclined position, as shown in FIG. 4, at least one venting line opens into a gas volume. Like the venting line 32, the venting lines 38, 40 are also guided in a curve in the region of the lower housing wall.

Figure 5:
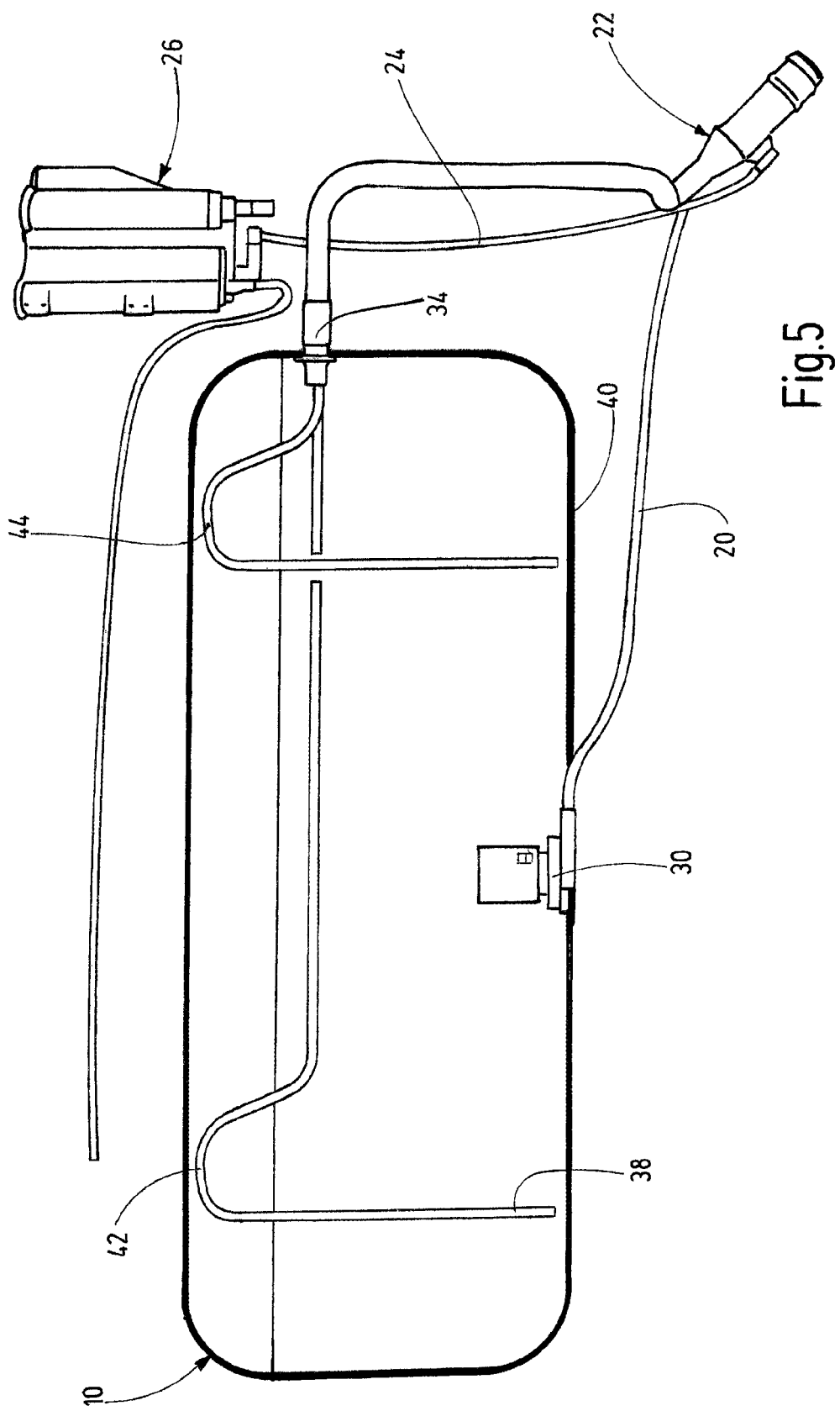
FIG. 5 shows the fuel tank according to FIG. 3 in an upside-down position.
Figure 6:
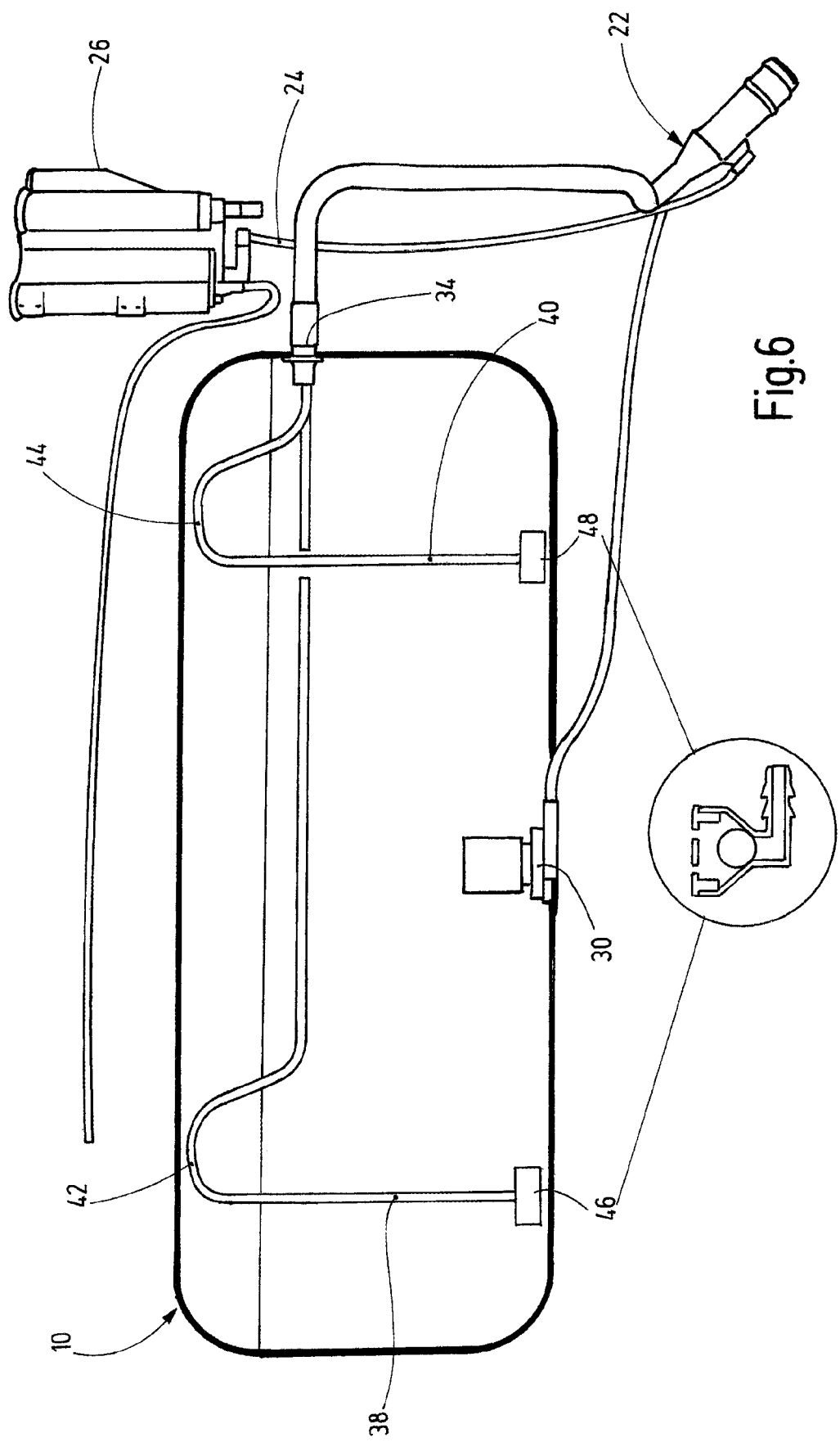
FIG. 6 shows the fuel tank according to FIG. 3 in an upside-down position and additional valves at the free ends of the venting lines.

In FIG. 5, the fuel tank of FIGS. 3 and 4 is in an upside-down position. The curves 42, 44 of the venting lines 38, 40 protrude beyond the liquid level and prevent liquid fuel from draining out via the venting lines due to fuel vapors enclosed therein. A very small quantity of liquid fuel cannot be prevented from entering the filling tube 22 via the lines 38, 40; however, due to the connection of the line 24 at a distance from the end of the filling tube 22, i.e., the provision of a certain volume between the connection of the line 24 and the end of the filling tube 22, it is ensured that no liquid fuel can enter the activated carbon filter via the line 24, which is to be avoided in any case. Accordingly, the mentioned volume in the end region of the filling tube 22 has a function of a liquid separator. FIG. 6 corresponds to FIG. 5, however, ball valves 46, 48 are arranged here at the free ends of the venting lines 38, 40, which close in the upside-down position and thus ensure an improved pressure retention function.

Figure 7:
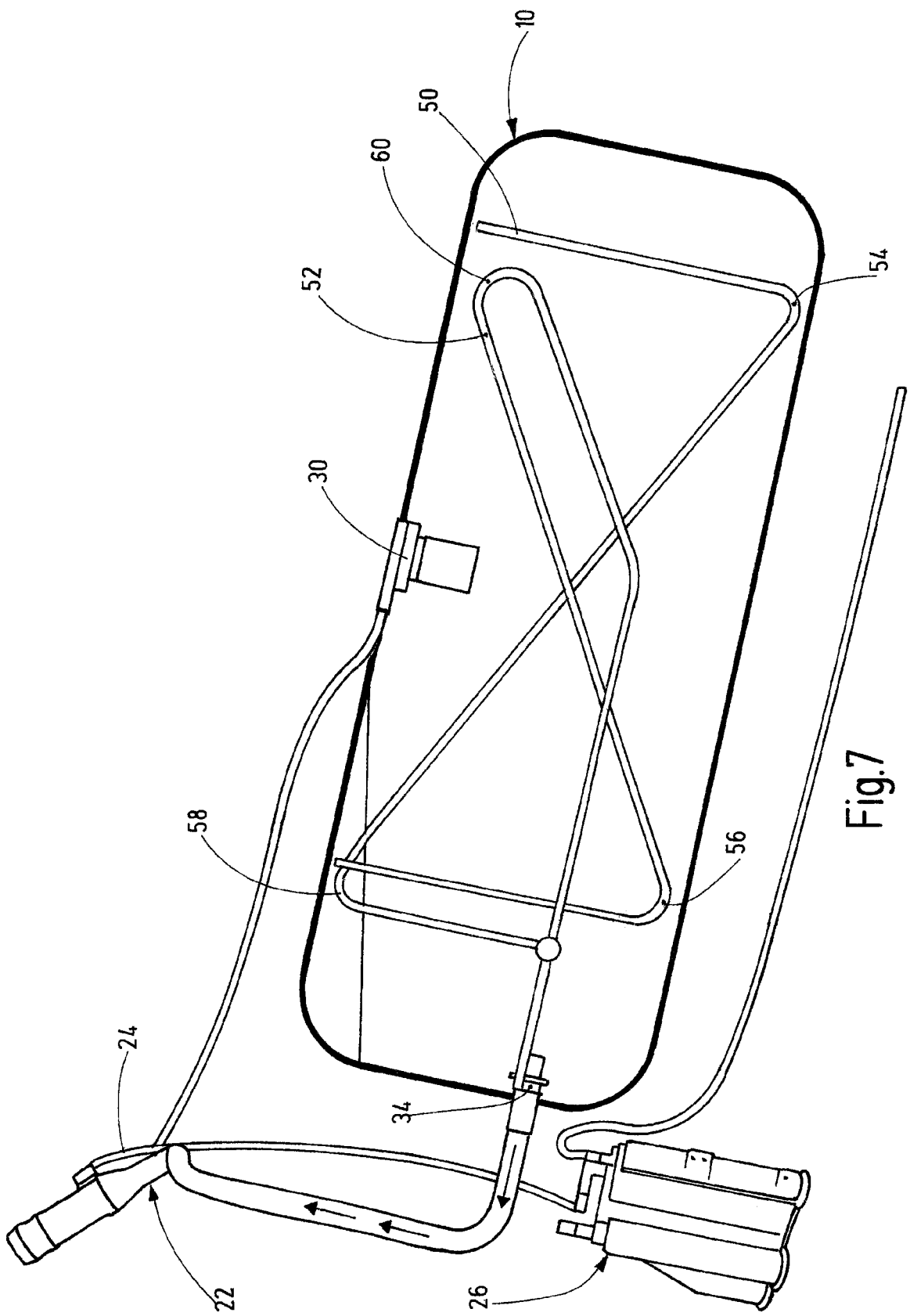
FIG. 7 shows a fuel tank comprising a further exemplary embodiment of a venting device having two venting lines and in an inclined position.
Figure 8:
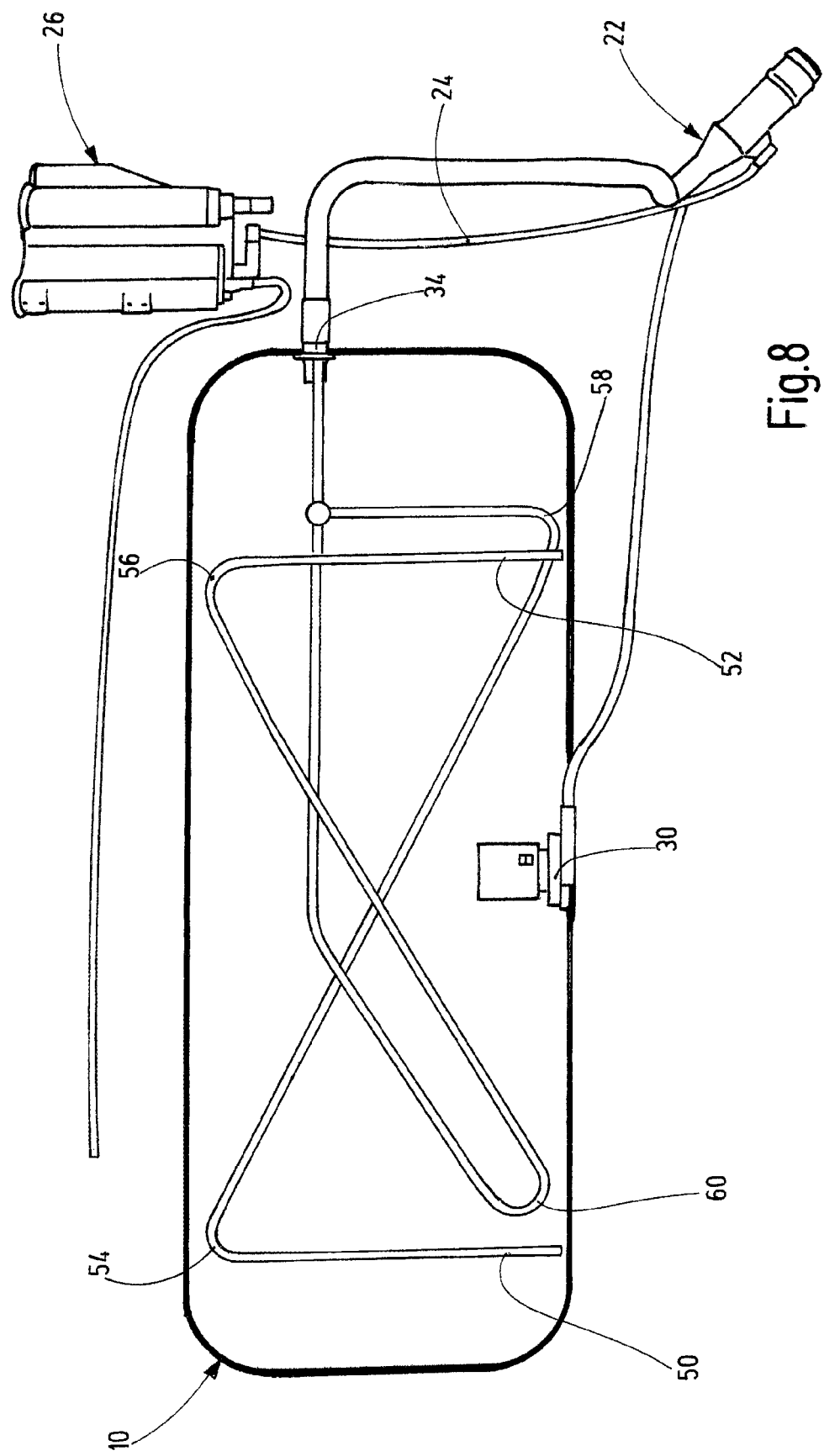
FIG. 8 shows the fuel tank according to FIG. 7 in an upside-down position.

FIGS. 7 and 8 show a further exemplary embodiment comprising two venting lines 50, 52, which are guided such that curves 54, 56, 58, 60 are formed both in the region of the lower wall part and also the upper wall part of the fuel tank 10. The upper curves 58, 60 are positioned in the vicinity of the open end of the respective other venting line 50, 52, and therefore they are located above the liquid level in the inclined position and prevent liquid from flowing out via the open end, which is then flooded.

FIG. 9 shows an inlet check valve 34, which has a connection part 64 for the connection to the filling tube 22 and a spring-loaded check flap 66, which opens toward the tank interior during fill-up. Furthermore, the valve has a bypass line 68, which bypasses the check flap, having a connection nipple for the at least one venting line, via which it is in fluid communication with the inlet tube.

The invention claimed is:

1. A fuel tank comprising a filling tube opening via an inlet check valve into the fuel tank and comprising a venting device for discharging fuel vapors from the fuel tank, wherein the venting device has at least one venting line, which extends into the interior of the fuel tank and opens with an open end into a gas volume in the region of an upper wall part of the fuel tank,
   wherein the at least one venting line is guided such that it forms a siphon in the region of a lower wall part, and the inlet check valve includes a side having a bypass connection, to which the at least one venting line is connected and an opposite side having a connection part connected to the filling tube such that the connected venting line is in fluid communication with the filling tube,
   wherein the bypass connection includes an inlet located inside the fuel tank, connected to the venting line, and communicating therewith, and
   wherein the connected end of the at least one venting line is terminated at the inlet check valve inside the fuel tank.

2. The fuel tank as claimed in claim 1, wherein at least two venting lines are provided, the open ends of which are arranged in the region of the upper wall part such that in any inclined position and any fill level of the fuel tank, at least one of the venting lines opens into a gas volume.

3. The fuel tank as claimed in claim 1, wherein a valve is arranged at the open end of the at least one venting line, which valve is open in a normal position of the fuel tank and closed in an upside-down position.

4. An inlet check valve for a fuel tank, wherein the inlet check valve is arranged at an end of a filling tube opening into the fuel tank, wherein a bypass line including an inlet formed in a check body of the inlet check valve bypasses the inlet check valve, wherein an end of at least one venting line arranged inside the fuel tank is connected to the inlet located inside the fuel tank, wherein the inlet check valve further includes an opposite side from a side connected to the venting line and the opposite side is formed with a connection part for connecting to the filing tube such that the at least one venting line is in fluid communication with the filling tube, and wherein the connected end of the at least one venting line is terminated at the body of the inlet check valve inside the fuel tank.

* * * * *